US012759150B2

(12) United States Patent
Mauger et al.

(10) Patent No.: US 12,759,150 B2
(45) Date of Patent: Oct. 13, 2026

(54) DYNAMIC WATER DISTRIBUTION SYSTEM

(71) Applicant: iRobot Corporation, Bedford, MA (US)

(72) Inventors: Jennifer Ann Mauger, Arlington, MA (US); Robert Sasena, Boston, MA (US)

(73) Assignee: iRobot Corporation, Bedford, MA (US)

( * ) Notice: Subject to any disclaimer, the term of this patent is extended or adjusted under 35 U.S.C. 154(b) by 309 days.

(21) Appl. No.: 18/534,396

(22) Filed: Dec. 8, 2023

(65) Prior Publication Data

US 2025/0187190 A1 Jun. 12, 2025

(51) Int. Cl.

*B25J 9/16* (2006.01)
*B25J 19/00* (2006.01)
*B25J 11/00* (2006.01)

(52) U.S. Cl.

CPC ............. *B25J 9/1669* (2013.01); *B25J 9/162* (2013.01); *B25J 19/0079* (2013.01); *B25J 11/0085* (2013.01)

(58) Field of Classification Search

CPC ... B25J 11/0085; A47L 2201/00; A47L 11/28; A47L 11/24; A47L 11/34
See application file for complete search history.

(56) References Cited

U.S. PATENT DOCUMENTS

2020/0383547 A1* 12/2020 Sutter ................. A47L 11/4066

* cited by examiner

*Primary Examiner* — Khoi H Tran
(74) *Attorney, Agent, or Firm* — MASCHOFF BRENNAN

(57) ABSTRACT

A mobile cleaning robot can be movable about a flooring surface of an environment and can include a body, a pad tray, a cleaning pad, and a pad drive system. The body can at least partially define a reservoir configured to store liquid therein. The pad tray can be connected to the body and can be movable with respect to the body between a stored position and a deployed position. The valve can be connected to the body and can be movable between a closed position where liquid flow is limited and an open position where liquid flow to the cleaning pad is permitted. The drive system can be movable such that the pad tray or the cleaning pad can engage the valve to move the valve to the open position when the drive system moves the pad tray and the cleaning pad to the deployed position.

20 Claims, 14 Drawing Sheets

DYNAMIC WATER DISTRIBUTION SYSTEM

BACKGROUND

Mobile robots include mobile cleaning robots that can perform cleaning tasks within an environment, such as a home. A mobile cleaning robot can navigate across a floor surface and avoid obstacles while vacuuming the floor surface and operating rotatable members carried by the robot to ingest debris from the floor surface. As the robot moves across the floor surface, the robot can rotate the rotatable members, which can engage the debris and guide the debris toward a vacuum airflow generated by the robot. The rotatable members and the vacuum airflow can thereby cooperate to allow the robot to ingest debris. The robot can also include one or more features to performing wet or dry dusting or mopping such as a mopping pad or mopping tray.

SUMMARY

Mobile cleaning robots can autonomously navigate through environments to perform cleaning operations, often traversing over, and navigating around, obstacles. Some mobile cleaning robots can include both vacuuming and mopping systems for performing one or more of vacuuming and mopping operations in a single cleaning mission or at the same time. Some mopping robots include cleaning pads to help increase mopping efficiency or effectiveness by mopping or scrubbing flooring surfaces with a wet pad. However, due to having to perform vacuuming operations of flooring such as carpet, which should not engage the mopping pad, the mopping pad can be stored to limit such contact. This means water also cannot be dispensed when the robot is performing vacuuming only operations, such as on carpeted flooring, requiring active water dispensing or dispensing control, such as by using a pump and injectors or dispensers, which can be relatively expensive and complex.

This disclosure describes solutions to these problems by including a valve that can be activated by the cleaning pad to dispense fluid onto the mopping pad only when the pad and pad plate are in a cleaning position. The valve can be passively activated when the pad and pad plate are in a cleaning position, and the fluid can be passively dispensed, which can help to save cost and energy during mopping missions of the mobile cleaning robot.

For example, a mobile cleaning robot can be movable about a flooring surface of an environment and can include a body, a pad tray, a cleaning pad, and a pad drive system. The body can at least partially define a reservoir configured to store liquid therein. The pad tray can be connected to the body and can be movable with respect to the body between a stored position and a deployed position. The valve can be connected to the body and can be movable between a closed position where liquid flow is limited and an open position where liquid flow to the cleaning pad is permitted. The drive system can be movable such that the pad tray or the cleaning pad can engage the valve to move the valve to the open position when the drive system moves the pad tray and the cleaning pad to the deployed position.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Robot Operation Summary

Figure 1:
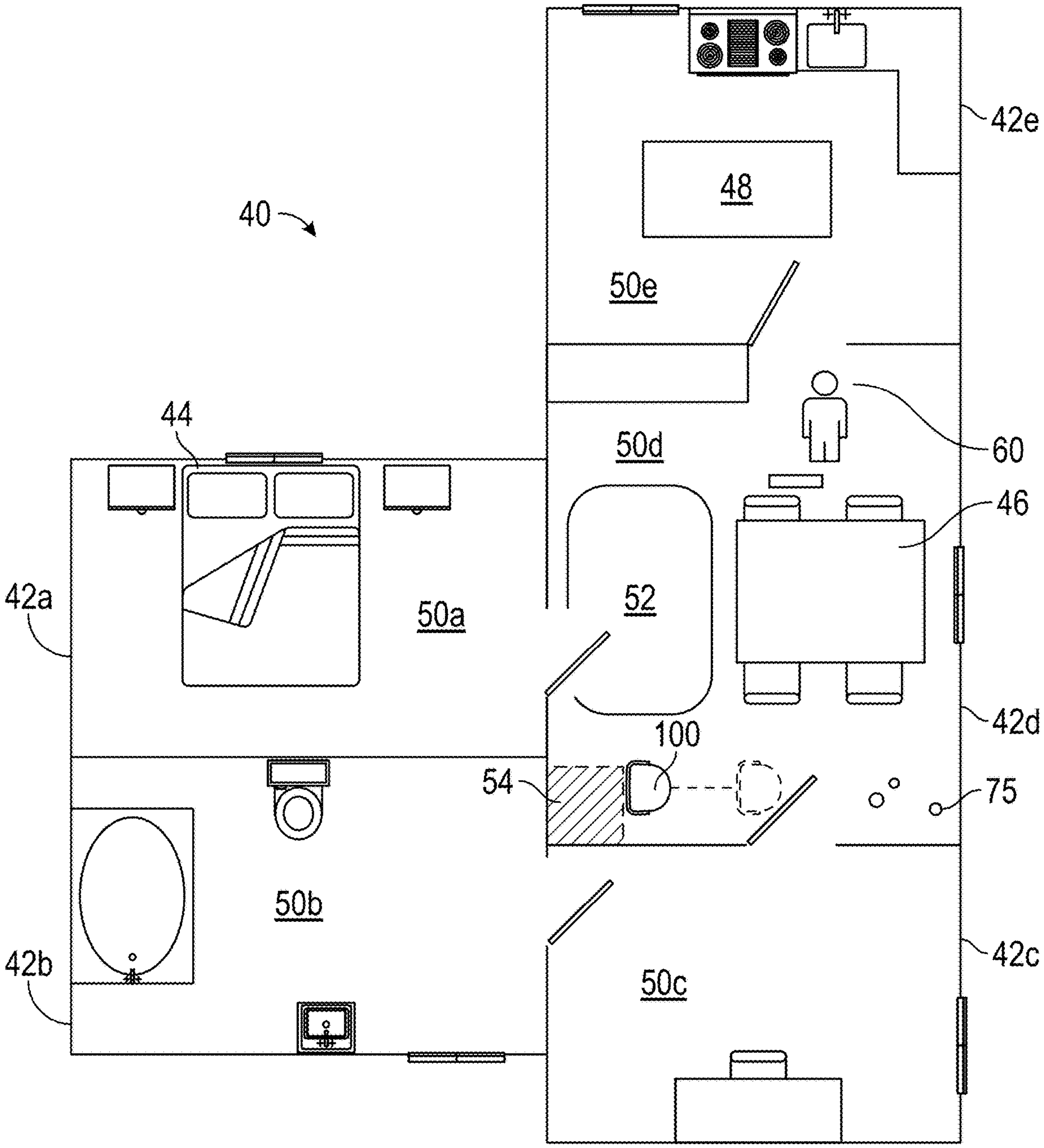
FIG. 1 illustrates a plan view of a mobile cleaning robot in an environment.

FIG. 1 illustrates a plan view of a mobile cleaning robot 100 in an environment 40, in accordance with at least one example of this disclosure. The environment 40 can be a dwelling, such as a home or an apartment, and can include rooms 42*a*-42*e*. Obstacles, such as a bed 44, a table 46, and an island 48 can be located in the rooms 42 of the environment. Each of the rooms 42*a*-42*e* can have a floor surface 50*a*-50*e*, respectively. Some rooms, such as the room 42*d*, can include a rug, such as a rug 52. The floor surfaces 50 can be of one or more types such as hardwood, ceramic, low-pile carpet, medium-pile carpet, long (or high)-pile carpet, stone, or the like.

The mobile cleaning robot 100 can be operated, such as by a user 60, to autonomously clean the environment 40 in a room-by-room fashion. In some examples, the robot 100 can clean the floor surface 50*a* of one room, such as the room 42*a*, before moving to the next room, such as the room 42*d*, to clean the surface of the room 42*d*. Different rooms can have different types of floor surfaces. For example, the room 42*e* (which can be a kitchen) can have a hard floor surface, such as wood or ceramic tile, and the room 42*a* (which can be a bedroom) can have a carpet surface, such as a medium pile carpet. Other rooms, such as the room 42*d* (which can be a dining room) can include multiple surfaces where the rug 52 is located within the room 42*d*.

During cleaning or traveling operations, the robot 100 can use data collected from various sensors (such as optical sensors) and calculations (such as odometry and obstacle detection) to develop a map of the environment 40. Once the map is created, the user 60 can define rooms or zones (such as the rooms 42) within the map. The map can be presentable to the user 60 on a user interface, such as a mobile device, where the user 60 can direct or change cleaning preferences, for example.

Also, during operation, the robot 100 can detect surface types within each of the rooms 42, which can be stored in the robot 100 or another device. The robot 100 can update the map (or data related thereto) such as to include or account for surface types of the floor surfaces 50*a*-50*e* of each of the respective rooms 42 of the environment 40. In some examples, the map can be updated to show the different surface types such as within each of the rooms 42.

In some examples, the user 60 can define a behavior control zone 54. In autonomous operation, the robot 100 can initiate a behavior in response to being in or near the behavior control zone 54. For example, the user 60 can define an area of the environment 40 that is prone to becoming dirty to be the behavior control zone 54. In response, the robot 100 can initiate a focused cleaning behavior in which the robot 100 performs a focused cleaning of a portion of the floor surface 50*d* in the behavior control zone 54.

Robot Example

Figure 2A:
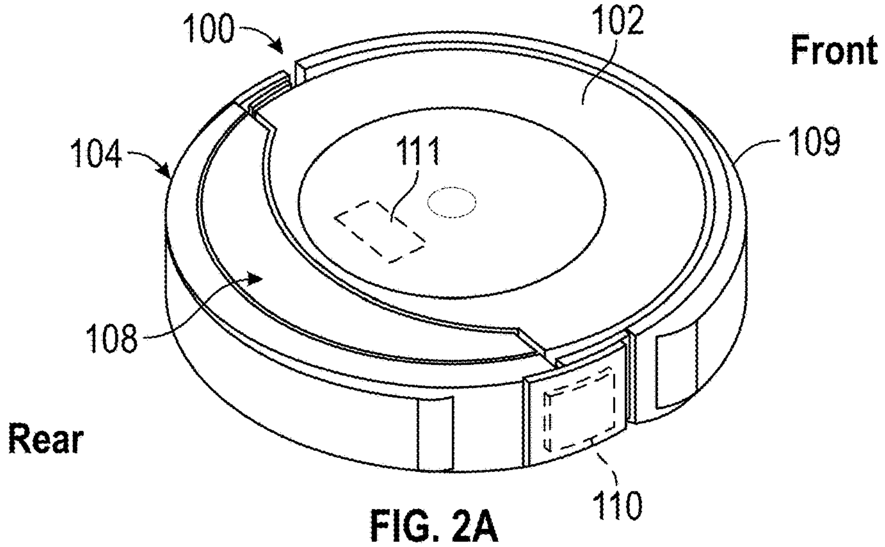
FIG. 2A illustrates an isometric view of a mobile cleaning robot in a first condition.
Figure 2B:
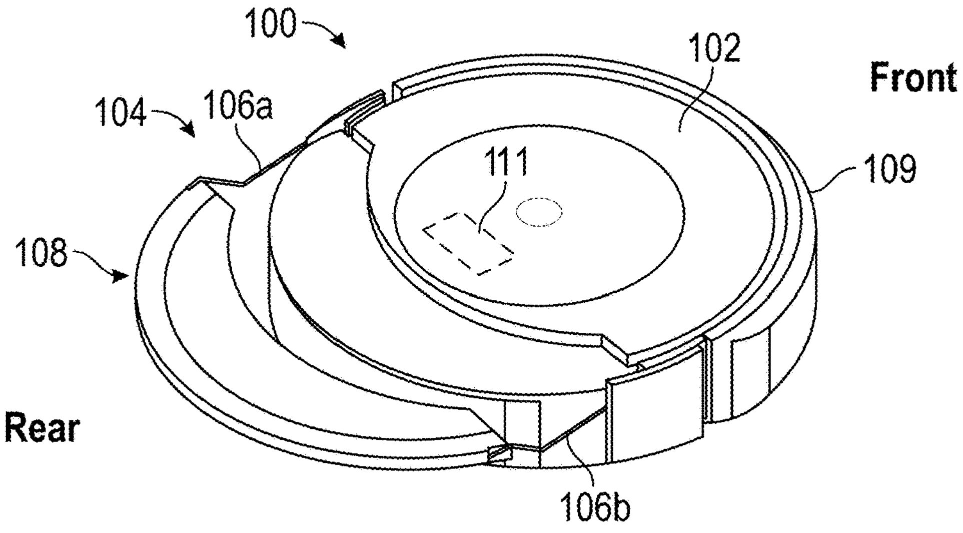
FIG. 2B illustrates an isometric view of a mobile cleaning robot in a second condition.
Figure 2C:
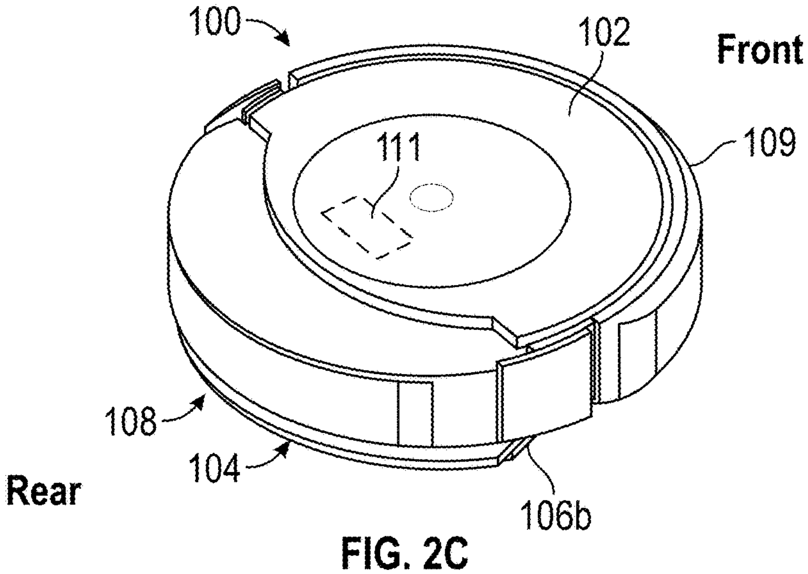
FIG. 2C illustrates an isometric view of a mobile cleaning robot in a third condition.

FIG. 2A illustrates an isometric view of a mobile cleaning robot 100 with a pad assembly in a stored position. FIG. 2B illustrates an isometric view of the mobile cleaning robot 100 with the pad assembly in an extended position. FIG. 2C illustrates an isometric view of the mobile cleaning robot 100 with the pad assembly in a mopping position. FIGS. 2A-2C also show orientation indicators Front and Rear. FIGS. 2A-2C are discussed together below.

The mobile cleaning robot 100 can include a body 102 and a mopping system 104. The mopping system 104 can include arms 106*a* and 106*b* (referred to together as arms 106) and a pad assembly 108. The robot 100 can also include a bumper 109 and other features such as an extractor (including rollers), one or more side brushes, a vacuum system, a controller, a drive system (e.g., motor, geartrain, and wheels), a caster, and sensors, as discussed in further detail below. A distal portion of the arms 106 can be connected to the pad assembly 108 and a proximal portion of the arms 106*a* and 106*b* can be connected to an internal drive system to drive the arms 106 to move the pad assembly 108.

Figure 2D:
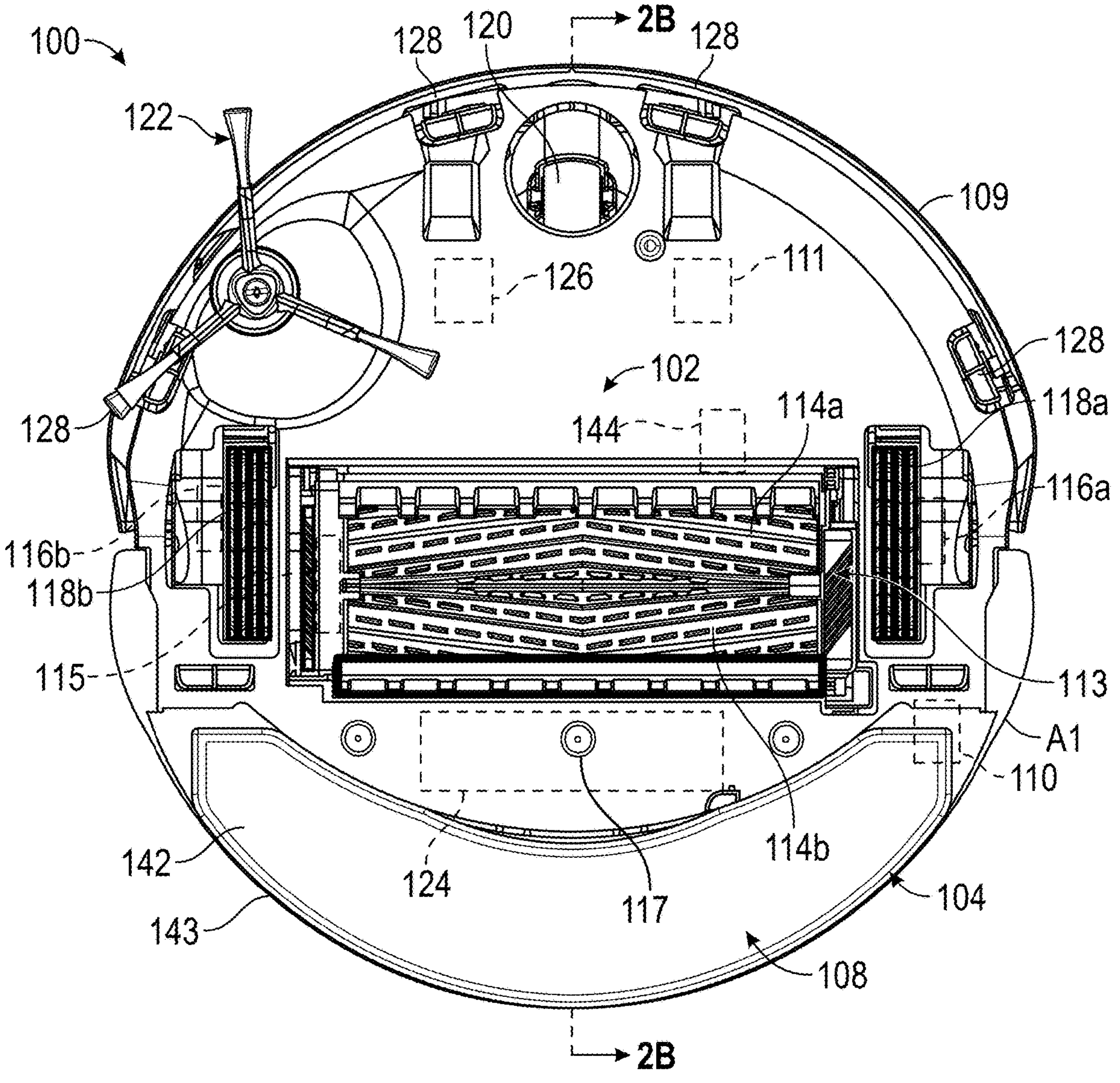
FIG. 2D illustrates a bottom view of a mobile cleaning robot in a third condition.
Figure 2E:
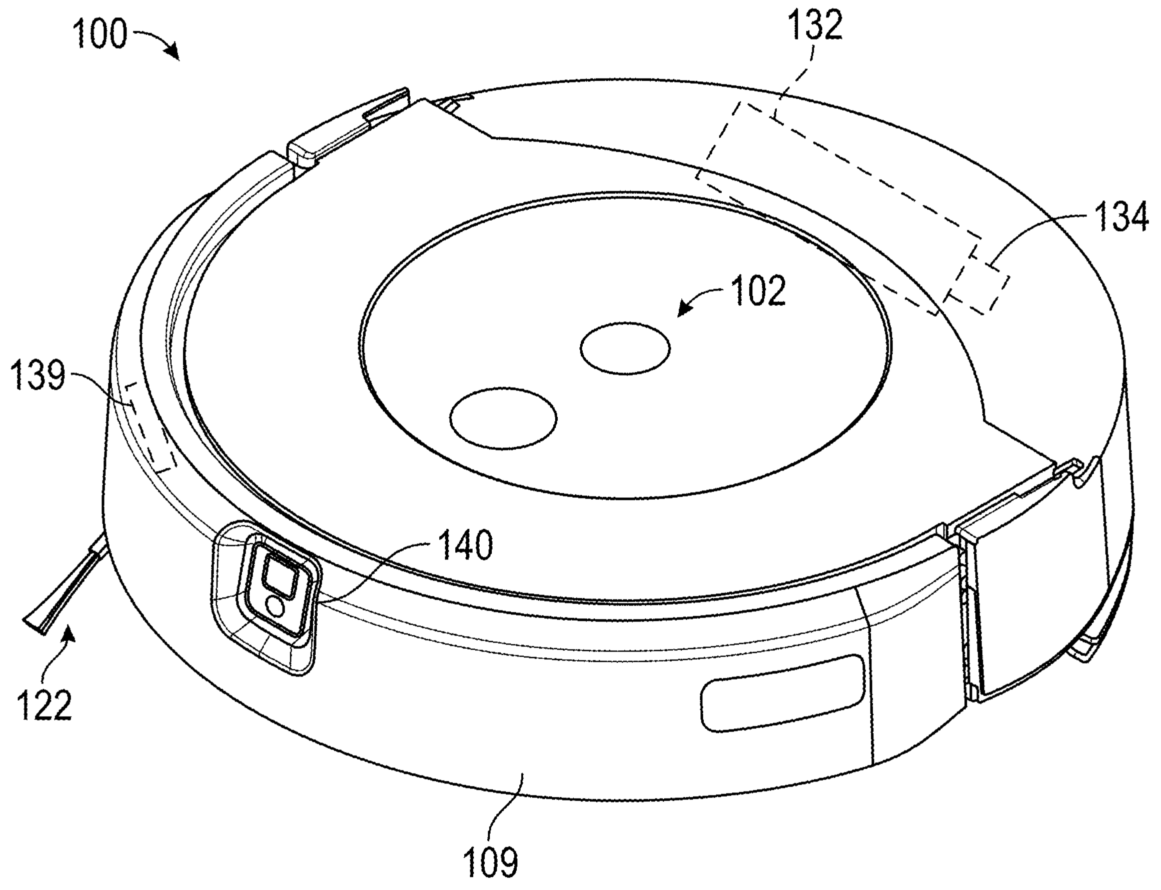
FIG. 2E illustrates a top isometric view of a mobile cleaning robot in a third condition.

FIGS. 2A-2C show how the robot 100 can be operated to move the pad assembly 108 from a stored position in FIG. 2A to a transition or partially deployed position in FIG. 2B, to a mopping or a deployed position in FIG. 2C. In the stored position of FIG. 2A, the robot 100 can perform only vacuuming operations. In the deployed position of FIG. 2C, the robot 100 can perform vacuuming operations or mopping operations. FIGS. 2D-2E discuss additional components of the robot 100.

Components of the Robot

FIG. 2D illustrates a bottom view of the mobile cleaning robot 100 and FIG. 2E illustrates a top isometric view of the robot 100. FIGS. 2D and 2E are discussed together below. The robot 100 of FIGS. 2D and 2E can be consistent with FIGS. 2A-2C; FIGS. 2D-2E show additional details of the robot 100. For example, FIGS. 2D-2E show that the robot 100 can include a body 102, a bumper 109, an extractor 113 (including rollers 114*a* and 114*b*), motors 116*a* and 116*b*, drive wheels 118*a* and 118*b*, a caster 120, a side brush assembly 122, a vacuum assembly 124, memory 126, and sensors 128. The mopping system 104 can also include a tank 132 and a pump 134.

The cleaning robot 100 can be an autonomous cleaning robot that can autonomously traverse the floor surface 50 (of FIG. 1) while ingesting the debris from different parts of the floor surface 50. As shown in FIG. 2D, the robot 100 can include the body 102 that can be movable across the floor surface 50. The body 102 can include multiple connected structures to which movable or fixed components of the cleaning robot 100 are mounted. The connected structures can include, for example, an outer housing to cover internal components of the cleaning robot 100, a chassis to which the drive wheels 118*a* and 118*b* and the cleaning rollers 114*a* and 114*b* (of the cleaning assembly 113) are mounted, and the bumper 109 connected to the outer housing. The caster wheel 120 can support the front portion of the body 102 above the floor surface 50, and the drive wheels 118*a* and 118*b* can support the middle and rear portions of the body 102 (and can also support a majority of the weight of the robot 100) above the floor surface 50.

As shown in FIG. 2D, the body 102 can include a front portion that can have a substantially semicircular shape and that can be connected to the bumper 109. The body 102 can also include a rear portion that has a substantially semicircular shape. In other examples, the body 102 can have other shapes such as a square front or straight front. The robot 100 can also include a drive system including the actuators (e.g., motors) 116*a* and 116*b*. The actuators 116*a* and 116*b* can be connected to the body 102 and can be operably connected to the drive wheels 118*a* and 118*b*, which can be rotatably mounted to the body 102. The actuators 116*a* and 116*b*, when driven, can rotate the drive wheels 118*a* and 118*b* to enable the robot 100 to autonomously move across the floor surface 50.

The vacuum assembly 124 can be located at least partially within the body 102 of the robot 100, such as in a rear portion of the body 102, and the vacuum assembly 124 can be located in other locations in other examples. The vacuum assembly 124 can include a motor to drive an impeller to generate the airflow when rotated. The airflow from the vacuum assembly 124 and the cleaning rollers 114, when rotated, can cooperate to ingest the debris into the robot 100.

The cleaning bin 130 (shown in FIG. 2F) can be mounted in the body 102 and can contain the debris ingested by the robot 100. A filter in the body 102 can separate the debris from the airflow before the airflow enters the vacuum assembly 124 and is exhausted out of the body 102. In this regard, the debris can be captured in both the cleaning bin 130 and the filter before the airflow is exhausted from the body 102. In some examples, the vacuum assembly 124 and extractor 113 can be optionally included or can be of a different type. Optionally, the vacuum assembly 124 can be operated during mopping operations, such as those including the mopping system 104. That is, the robot 100 can perform simultaneous vacuuming and mopping missions or operations.

The cleaning rollers 114*a* and 114*b* can be operably connected to an actuator 115, e.g., a motor, through a gearbox. The cleaning head 113 and the cleaning rollers 114*a* and 114*b* can be located forward of the cleaning bin 130. The cleaning rollers 114 can be mounted or connected to an underside of the body 102 so that the cleaning rollers 114*a* and 114*b* can engage debris on the floor surface 50 during the cleaning operation when the underside of the body 102 faces the floor surface 50.

The controller 111 can be located at least partially within the housing 102 and can be a programmable controller, such as a single or multi-board computer, a direct digital controller (DDC), a programmable logic controller (PLC), or the like. In other examples, the controller 111 can be any computing device, such as a handheld computer, for example, a smart phone, a tablet, a laptop, a desktop computer, or any other computing device including a processor, memory, and communication capabilities. The memory 126 can be one or more types of memory, such as volatile or non-volatile memory, read-only memory (ROM), random-access memory (RAM), magnetic disk storage media, optical storage media, flash-memory devices, and other storage devices and media. The memory 126 can be located within the housing 102, can be connected to the controller 111, and can be accessible by the controller 111.

The controller 111 can operate the actuators 116*a* and 116*b* to autonomously navigate the robot 100 about the floor surface 50 during a cleaning operation. The actuators 116*a* and 116*b* can be operable to drive the robot 100 in a forward drive direction, in a backwards direction, and to turn the robot 100. The controller 111 can operate the vacuum assembly 124 to generate an airflow that flows through an air gap near the cleaning rollers 114, through the body 102, and out of the body 102.

The robot 100 can include a sensor system including one or more sensors. The sensor system, as described herein, can generate one or more signal indicative of a current location of the robot 100, and can generate signals indicative of locations of the robot 100 as the robot 100 travels along the floor surface 50. The sensors 128 (shown in FIG. 2A) can be located along a bottom portion of the housing 102. Each of the sensors 128 can be an optical sensor that can be configured to detect a presence or absence of an object below the optical sensor, such as the floor surface 50. The sensors 128 (optionally cliff sensors) can be connected to the controller 111 and can be used by the controller 111 to navigate the robot 100 within the environment 40. In some examples, the cliff sensors can be used to detect a floor surface type which the controller 111 can use to selectively operate the mopping system 104.

The cleaning pad assembly 108 can be a cleaning pad connected to the bottom portion of the body 102 (or connected to the actuator 110 that can be configured to move the assembly 108 between a stored position and a cleaning position), such as to the cleaning bin 130 in a location to the rear of the extractor 113. The tank 132 can be a water tank configured to store water or fluid, such as cleaning fluid, for delivery to a mopping pad 142. The pump 134 can be connected to the controller 111 and can be in fluid communication with the tank 132. The controller 111 can be configured to operate the pump 134 to deliver fluid to the mopping pad 142 during mopping operations. For example, fluid can be delivered through one or more dispensers 117 to the mopping pad 142. The dispenser(s) 117 can be a valve, opening, or the like and can be configured to deliver fluid to the floor surface 50 of the environment 40 or to the pad 142 directly. In some examples, the pad 142 can be a dry pad such as for dusting or dry debris removal. The pad 142 can be supported by a pad tray 143 connected to the arm 106. The mopping pad 142 can also be any cloth, fabric, or the like configured for cleaning (either wet or dry) of a floor surface.

Figure 2F:
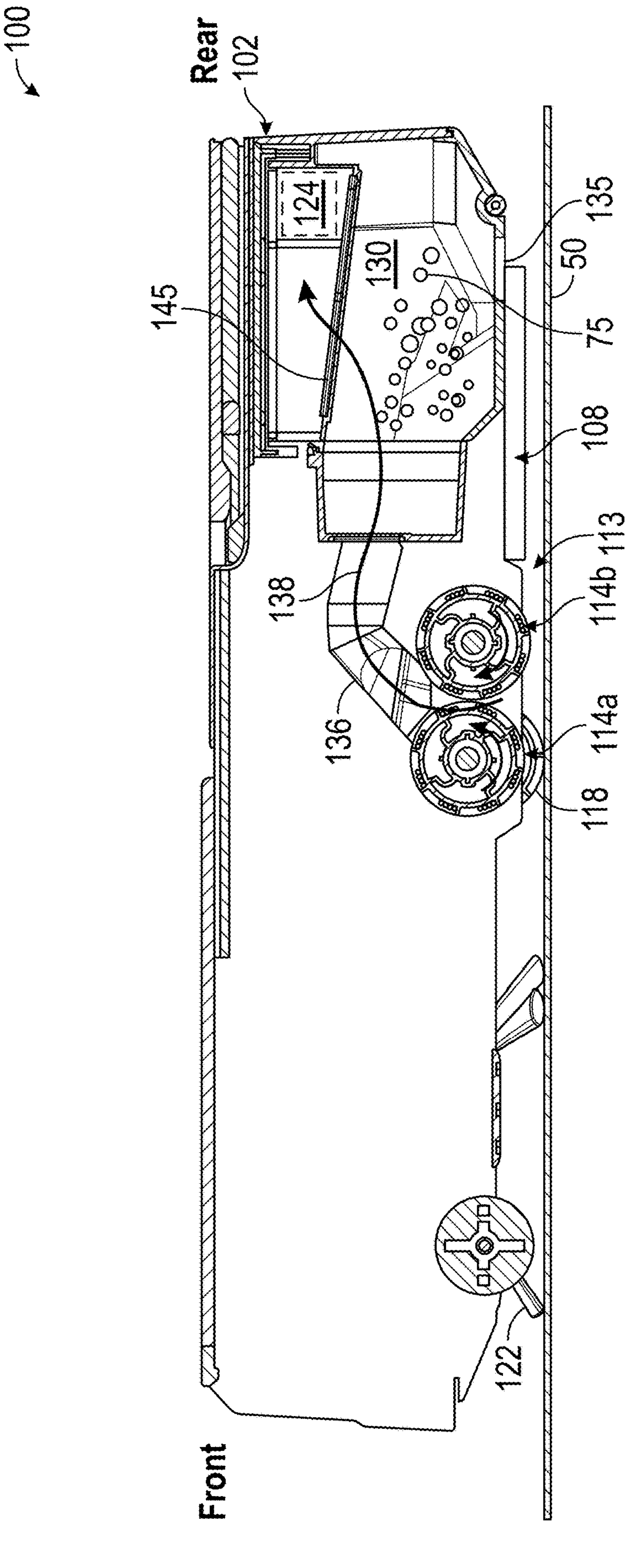
FIG. 2F illustrates a side cross-sectional view of a mobile cleaning robot in a first condition.

As shown in FIG. 2F, the vacuum assembly 124 can be located at least partially within the body 102 of the robot 100, e.g., in the rear portion of the body 102. The controller 111 can operate the vacuum assembly 124 to generate an airflow that flows through the air gap near the cleaning rollers 114, through the body 102, and out of the body 102. The airflow and the cleaning rollers 114, when rotated, can cooperate to ingest debris 75 into a suction duct 136 of the robot 100. The suction duct 136 can extend down to or near a bottom portion of the body 102 and can be at least partially defined by the cleaning assembly 113.

The suction duct 136 can be connected to the cleaning head 113 or cleaning assembly and can be connected to a cleaning bin 130. The cleaning bin 130 can be mounted in the body 102 and can contain the debris 75 ingested by the robot 100. A filter or pre-filter 145 can be located in the body 102, which can help to separate the debris 75 from the airflow before the airflow 138 enters the vacuum assembly 124 and is exhausted out of the body 102. In this regard, the debris 75 can be captured in both the cleaning bin 130 and the filter before the airflow 138 is exhausted from the body 102. The robot 100 can also include a debris port 135 that can extend at least partially through the body 102 or the cleaning bin 130 and can be operable to remove the debris 75 from the cleaning bin 130, such as via a docking station or evacuation station.

The cleaning rollers 114*a* and 114*b* can operably connected to one or more actuators 115, e.g., motors, respectively. The cleaning head 113 and the cleaning rollers 114*a* and 114*b* can be positioned forward of the cleaning bin 130. The cleaning rollers 114*a* and 114*b* can be mounted to a housing of the cleaning head 113 and mounted, e.g., indirectly or directly, to the body 102 of the robot 100. In particular, the cleaning rollers 114*a* and 114*b* can be mounted to an underside of the body 102 so that the cleaning rollers 114*a* and 114*b* engage debris 75 on the floor surface 50 during the cleaning operation when the underside faces the floor surface 50.

Operation of the Robot

In operation of some examples, the controller 111 can be used to instruct the robot 100 to perform a mission. In such a case, the controller 111 can operate the motors 116 to drive the drive wheels 118 and propel the robot 100 along the floor surface 50. The robot 100 can be propelled in a forward drive direction or a rearward drive direction. The robot 100 can also be propelled such that the robot 100 turns in place or turns while moving in the forward drive direction or the rearward drive direction. In addition, the controller 111 can operate the motors 115 to cause the rollers 114*a* and 114*b* to rotate, can operate the side brush assembly 122, and can operate the motor of the vacuum system 124 to generate airflow. The controller 111 can execute software stored on the memory 126 to cause the robot 100 to perform various navigational and cleaning behaviors by operating the various motors of the robot 100.

The various sensors of the robot 100 can be used to help the robot navigate and clean within the environment 40. For example, the cliff sensors can detect obstacles such as drop-offs and cliffs below portions of the robot 100 where the cliff sensors are disposed. The cliff sensors can transmit signals to the controller 111 so that the controller 111 can redirect the robot 100 based on signals from the sensors.

Proximity sensors can produce a signal based on a presence or the absence of an object in front of the optical sensor. For example, detectable objects include obstacles such as furniture, walls, persons, and other objects in the environment 40 of the robot 100. The proximity sensors can transmit signals to the controller 111 so that the controller 111 can redirect the robot 100 based on signals from the proximity sensors. In some examples, a bump sensor can be used to detect movement of the bumper 109 along a fore-aft axis of the robot 100. A bump sensor 139 can also be used to detect movement of the bumper 109 along one or more sides of the robot 100 and can optionally detect vertical bumper movement. The bump sensors 139 can transmit signals to the controller 111 so that the controller 111 can redirect the robot 100 based on signals from the bump sensors 139.

The robot 100 can also optionally include one or more dirt sensors 144 connected to the body 102 and in communication with the controller 111. The dirt sensors 144 can be a microphone, piezoelectric sensor, optical sensor, or the like located in or near a flow path of debris, such as near an opening of the cleaning rollers 114 or in one or more ducts within the body 102. This can allow the dirt sensor(s) 144 to detect how much dirt is being ingested by the vacuum assembly 124 (e.g., via the extractor 113) at any time during a cleaning mission. Because the robot 100 can be aware of its location, the robot 100 can keep a log or record of which areas or rooms of the map are dirtier or where more dirt is collected.

The image capture device 140 can be configured to generate a signal based on imagery of the environment 40 of the robot 100 as the robot 100 moves about the floor surface 50. The image capture device 140 can transmit such a signal to the controller 111. The controller 111 can use the signal or signals from the image capture device 140 for various tasks, algorithms, or the like, as discussed in further detail below.

In some examples, the obstacle following sensors can detect detectable objects, including obstacles such as furniture, walls, persons, and other objects in the environment of the robot 100. In some implementations, the sensor system can include an obstacle following sensor along the side surface, and the obstacle following sensor can detect the presence or the absence an object adjacent to the side surface. The one or more obstacle following sensors can also serve as obstacle detection sensors, similar to the proximity sensors described herein.

The robot 100 can also include sensors for tracking a distance travelled by the robot 100. For example, the sensor system can include encoders associated with the motors 116 for the drive wheels 118, and the encoders can track a distance that the robot 100 has travelled. In some implementations, the sensor can include an optical sensor facing downward toward a floor surface. The optical sensor can be positioned to direct light through a bottom surface of the robot 100 toward the floor surface 50. The optical sensor can detect reflections of the light and can detect a distance travelled by the robot 100 based on changes in floor features as the robot 100 travels along the floor surface 50.

The controller 111 can use data collected by the sensors of the sensor system to control navigational behaviors of the robot 100 during the mission. For example, the controller 111 can use the sensor data collected by obstacle detection sensors of the robot 100, (the cliff sensors, the proximity sensors, and the bump sensors) to enable the robot 100 to avoid obstacles within the environment of the robot 100 during the mission.

The sensor data can also be used by the controller 111 for simultaneous localization and mapping (SLAM) techniques in which the controller 111 extracts features of the environment represented by the sensor data and constructs a map of the floor surface 50 of the environment. The sensor data collected by the image capture device 140 can be used for techniques such as vision-based SLAM (VSLAM) in which the controller 111 extracts visual features corresponding to objects in the environment 40 and constructs the map using these visual features. As the controller 111 directs the robot 100 about the floor surface 50 during the mission, the controller 111 can use SLAM techniques to determine a location of the robot 100 within the map by detecting features represented in collected sensor data and comparing the features to previously stored features. The map formed from the sensor data can indicate locations of traversable and nontraversable space within the environment. For example, locations of obstacles can be indicated on the map as nontraversable space, and locations of open floor space can be indicated on the map as traversable space.

The sensor data collected by any of the sensors can be stored in the memory 126. In addition, other data generated for the SLAM techniques, including mapping data forming the map, can be stored in the memory 126. These data produced during the mission can include persistent data that are produced during the mission and that are usable during further missions. In addition to storing the software for causing the robot 100 to perform its behaviors, the memory 126 can store data resulting from processing of the sensor data for access by the controller 111. For example, the map can be a map that is usable and updateable by the controller 111 of the robot 100 from one mission to another mission to navigate the robot 100 about the floor surface 50.

The persistent data, including the persistent map, can help to enable the robot 100 to efficiently clean the floor surface 50. For example, the map can enable the controller 111 to direct the robot 100 toward open floor space and to avoid nontraversable space. In addition, for subsequent missions, the controller 111 can use the map to optimize paths taken during the missions to help plan navigation of the robot 100 through the environment 40.

The controller 111 can also send commands to a motor or actuator 110 (shown in FIG. 2A) that can be connected to the arms 106 and can be located at least partially within the body 102, where the command(s) can drive the arms 106 to move the pad assembly 108 between the stored position (shown in FIGS. 2A) and the deployed position (shown in FIGS. 2C and 2D). In the deployed position, the pad assembly 108 (the mopping pad 142) can be used to mop a floor surface of any room of the environment 40.

The mopping pad 142 can be a dry pad or a wet pad. Optionally, when the mopping pad 142 is a wet pad, the pump 134 can be operated by the controller 111 to spray or drop fluid (e.g., water or a cleaning solution) onto the floor surface 50 or the mopping pad 142. The wetted mopping pad 142 can then be used by the robot 100 to perform wet mopping operations on the floor surface 50 of the environment 40. Optionally, the pump 134 can be omitted, as discussed in further detail below.

Network Examples

Figure 3:
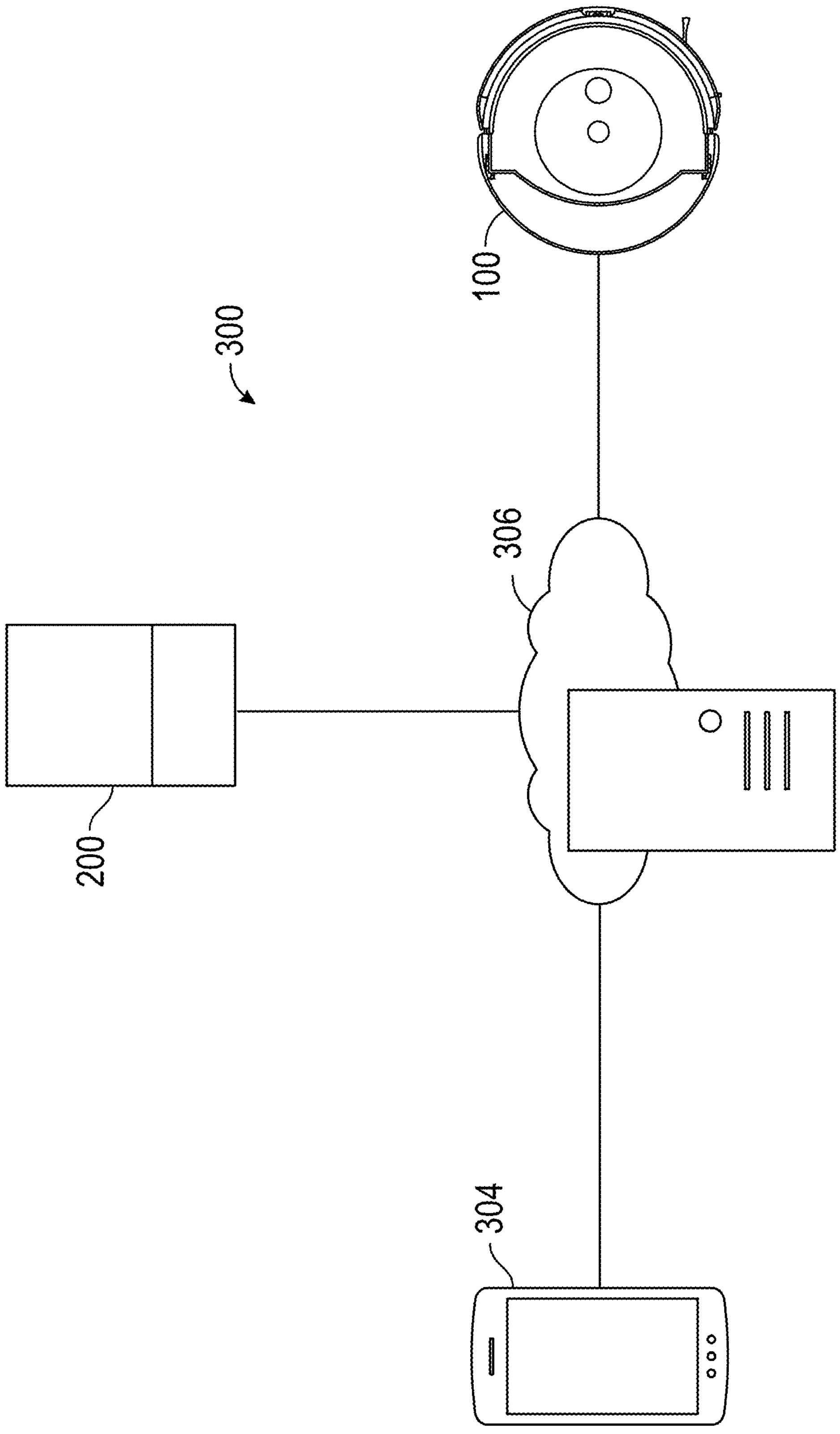
FIG. 3 illustrates a diagram illustrating an example of a communication network in which a mobile cleaning robot operates and data transmission in the network.

FIG. 3 is a diagram showing a communication network 300 that enables networking between the mobile robot 100 and one or more other devices, a docking station 200 (or any of the docking stations discussed herein), a mobile device 304 (including a controller), a cloud computing system 306 (including a controller), or another autonomous robot separate from the mobile robot 100. Using the communication network 300, the robot 100, the mobile device 304, the docking station 200, and the cloud computing system 306 can communicate with one another to transmit and receive data from one another. In some examples, the robot 100, the docking station 200, or both the robot 100 and the docking station 200 can communicate with the mobile device 304 through the cloud computing system 306. Alternatively, or additionally, the robot 100, the docking station 200, or both the robot 100 and the docking station 200 can communicate directly with the mobile device 304. Various types and combinations of wireless networks (e.g., Bluetooth, radio frequency, optical based, etc.) and network architectures (e.g., wi-fi or mesh networks) can be employed by the communication network 300.

In some examples, the mobile device 304 can be a remote device that can be linked to the cloud computing system 306 and can enable a user to provide inputs. The mobile device 304 can include user input elements such as, for example, one or more of a touchscreen display, buttons, a microphone, a mouse, a keyboard, or other devices that respond to inputs provided by the user. The mobile device 304 can also include immersive media (e.g., virtual reality or augmented reality) with which the user can interact to provide input. The mobile device 304, in these examples, can be a virtual reality headset or a head-mounted display.

The user can provide inputs corresponding to commands for the mobile robot 100. In such cases, the mobile device 304 can transmit a signal to the cloud computing system 306 to cause the cloud computing system 306 to transmit a command signal to the mobile robot 100. In some implementations, the mobile device 304 can present augmented reality images. In some implementations, the mobile device 304 can be a smart phone, a laptop computer, a tablet computing device, or other mobile device.

In some examples, the communication network 300 can include additional nodes. For example, nodes of the communication network 300 can include additional robots. Also, nodes of the communication network 300 can include network-connected devices that can generate information about the environment 40. Such a network-connected device can include one or more sensors, such as an acoustic sensor, an image capture system, or other sensor generating signals, to detect characteristics of the environment 40 from which features can be extracted. Network-connected devices can also include home cameras, smart sensors, or the like.

In the communication network 300, the wireless links can utilize various communication schemes, protocols, etc., such as, for example, Bluetooth classes, Wi-Fi, Bluetooth-low-energy, also known as BLE, 802.15.4, Worldwide Interoperability for Microwave Access (WiMAX), an infrared channel, satellite band, or the like. In some examples, wireless links can include any cellular network standards used to communicate among mobile devices, including, but not limited to, standards that qualify as 1G, 2G, 3G, 4G, 5G, or the like. The network standards, if utilized, qualify as, for example, one or more generations of mobile telecommunication standards by fulfilling a specification or standards such as the specifications maintained by International Telecommunication Union. For example, the 4G standards can correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards can use various channel access methods, e.g., FDMA, TDMA, CDMA, or SDMA.

Dynamic Water Distribution Examples

Figure 4:
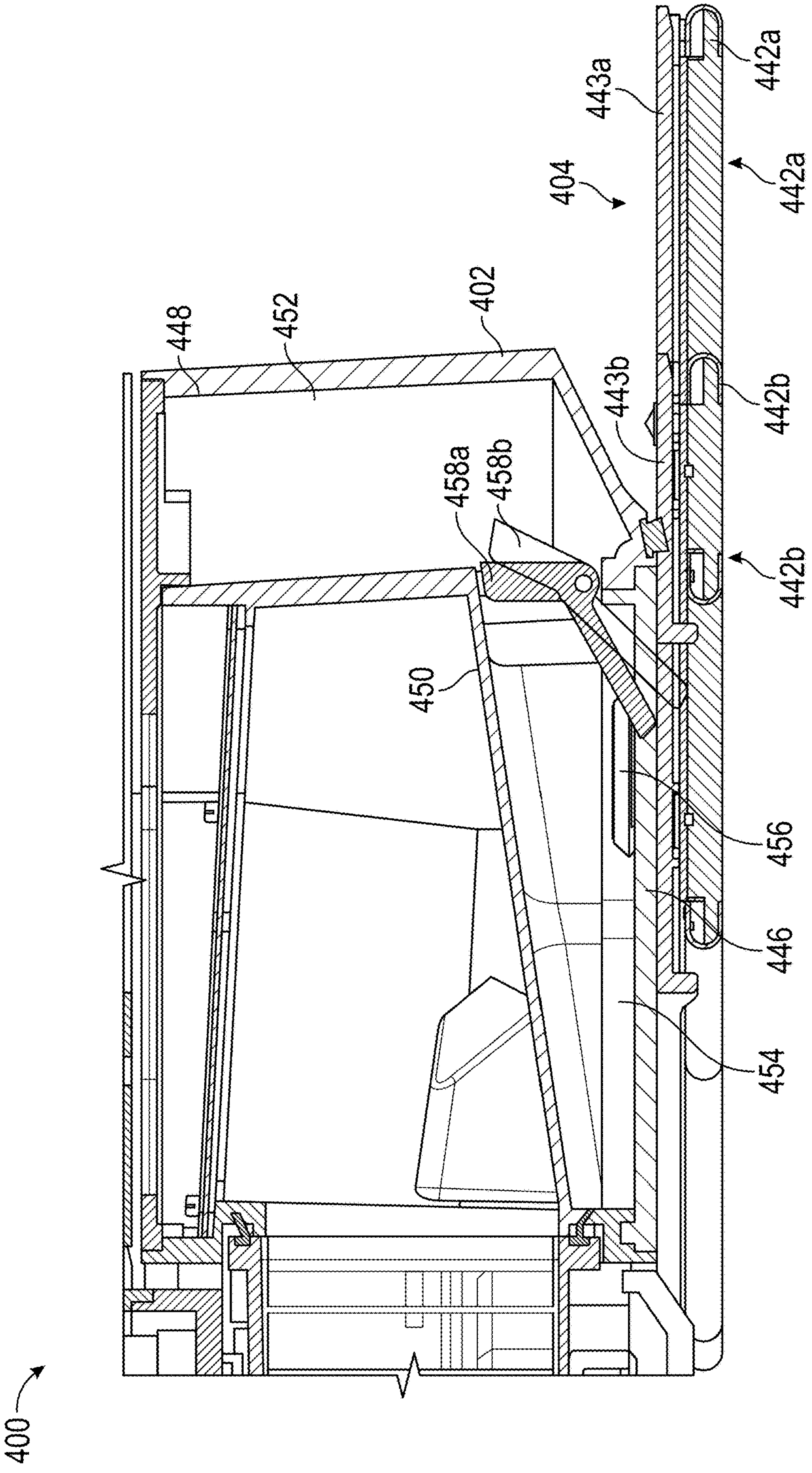
FIG. 4 illustrates a cross-section view of a portion of a mobile cleaning robot.

FIG. 4 illustrates a cross-section view of a portion of a mobile cleaning robot 400. The mobile cleaning robot 400 can be similar to the mobile cleaning robot 100 discussed above; the mobile cleaning robot 400 can include one or more features to enable dynamic water distribution to a mopping pad. Any of the mobile cleaning robots discussed above or below can include the features of the mobile cleaning robot 400.

The mobile cleaning robot 400 can include a body 402, which can be similar to the body 102. The body 402 can include lower portion 446, such as a skid, an outer wall 448, and an inner wall 450. The mobile cleaning robot 400 can also include a mopping system 404, which can be similar to the mopping system 104 and can include a mopping pad 442 and a pad tray 443. The mopping system 404 can also include one or more arms (e.g., the arms 106) that can connect the pad tray 443 to the body 402 or other component of the mobile cleaning robot 400.

The mopping system 404 can also include a drive system or actuator (e.g., the actuator 110) configured to move the mopping pad 442 and the pad tray 443 relative to the body 402 between a stored position (e.g., above the body 402, as shown in FIG. 2A) and a deployed position (e.g., below the body 402, as shown in FIG. 2C). The actuator 110 can be, can include, or can be a part of a drive system similar to any of those discussed in U.S. patent application Ser. No. 17/388,293, entitled "Two In One Mobile Cleaning Robot," filed on Jul. 29, 2021, to Michael G. Sack, which is incorporated by reference herein in its entirety.

The outer wall 448 and the inner wall 450 can together at least partially form a reservoir 452 that can be configured to receive and store liquid therein. The lower portion 446 and the inner wall 450 can together at least partially form a dispenser reservoir 454 that can be fluidically connected or connectable to the reservoir 452 and can be located downstream therefrom. The mobile cleaning robot 400 can also include a wicking device 456 that can be connected to the lower portion 446 and can extend at least partially through the lower portion 446. The wicking device 456 can be located at least partially in the dispenser reservoir 454 downstream of the reservoir 452.

The body 402 can also include a valve 458 that can be connected to the body 402 (e.g., to the inner wall 450 or the lower portion 446). As discussed in further detail below, the valve 458 can be movable between a closed position **458*a*, where liquid flow is limited, and an open position 458*b*, where liquid flow to the cleaning pad is permitted. The mopping pad 442 or the pad tray 443 can move from a pad position 442*a* and a pad tray position 443*a* to a pad position 442*b* and a pad tray position 443*b* such that the mopping pad 442 or the pad tray 443 engages the valve 458 to move the valve 458 from the closed position 458*a* to the open position 458*b*. When the valve 458 is in the open position, liquid can be dispensed by the robot 400 from the reservoir 452 to the dispenser reservoir 454 to be exposed to the wicking device 456. The wicking device 456 can be configured to receive and dispense the liquid to the cleaning pad 442**.

Figure 5:
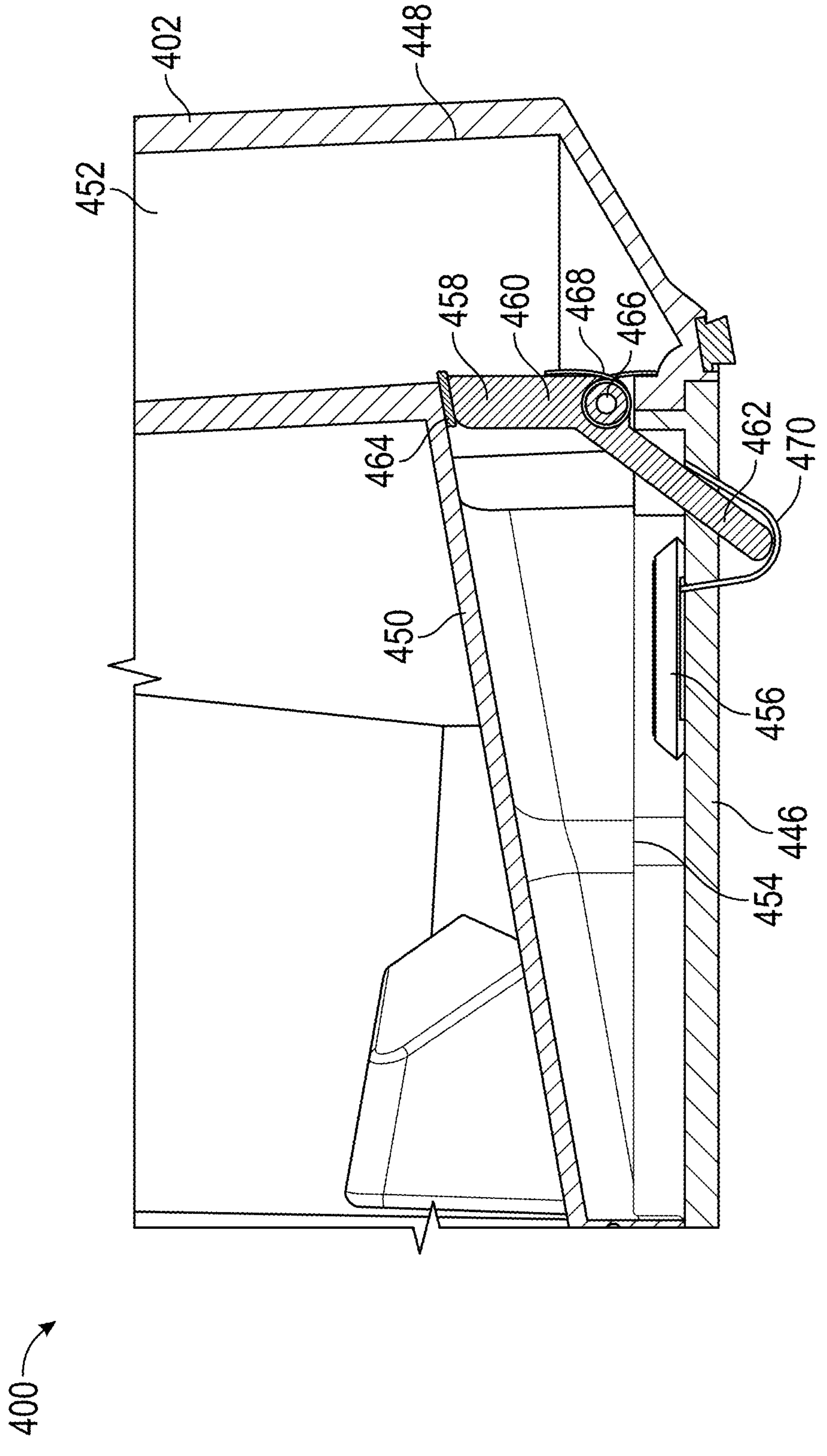
FIG. 5 illustrates a cross-section view of a portion of a mobile cleaning robot.

FIG. 5 illustrates a cross-section view of a portion of the mobile cleaning robot 400. The mobile cleaning robot 400 of FIG. 5 can be consistent with FIG. 4. FIG. 5 shows additional details of the mobile cleaning robot 400.

For example, FIG. 5 shows that the valve 458 can include a body 460 and a leg 462. The body 460 can be connected to the leg 462. The leg 462 can be configured to extend below a bottom surface of the body 402 such that the pad tray 443 can engage the leg to move the valve 458 to the open position when the pad tray 443 moves to the deployed position, as discussed in further detail below.

The body 460 of the valve 458 can be engageable with the inner wall 450 and with a gasket 464 (or seal) such as to seal the reservoir 452 from the dispenser reservoir 454 when the valve 458 is in the closed position. The valve 458 can be connected to the body 402 via a pivot 466 (e.g., connected to the body 460 or the leg 462). The pivot 466 can be a pin, bearing, or the like configured to allow the valve 458 to pivot or rotate about the pivot 466 with respect to the body 402 between the open position and the closed position.

The mobile cleaning robot 400 can also include a biasing element 468 that can be connected to the valve 458 and to the body 402. The biasing element 468 can be configured to engage the body 402 and the valve 458 to bias the valve 458 toward the closed position, as shown in FIG. 5. The biasing element 468 can be a torsion spring, extension spring, compression spring, or the like.

The mobile cleaning robot 400 can also include a membrane 470 connected to the body 402 (e.g., to the lower portion 446 of the body 402) that can be configured to at least partially cover or surround the leg 462 of the valve 458. The membrane 470 can at least partially form a seal around the biasing element 468 while being flexible sufficiently to allow the leg 462 to move between the open position and the closed position. The membrane 470 can have a relatively small thickness such that the 470 can flex or move with the valve 458.

The mobile cleaning robot 400 can also include a drive system connected to the body 402 and connected to the pad tray 443, such as via arms (e.g., 106). The drive system can be operable to move the pad tray 443 and the cleaning pad 442 with respect to the body 402 between the stored position and the deployed position, as shown in FIGS. 2A-2C.

Figure 6:
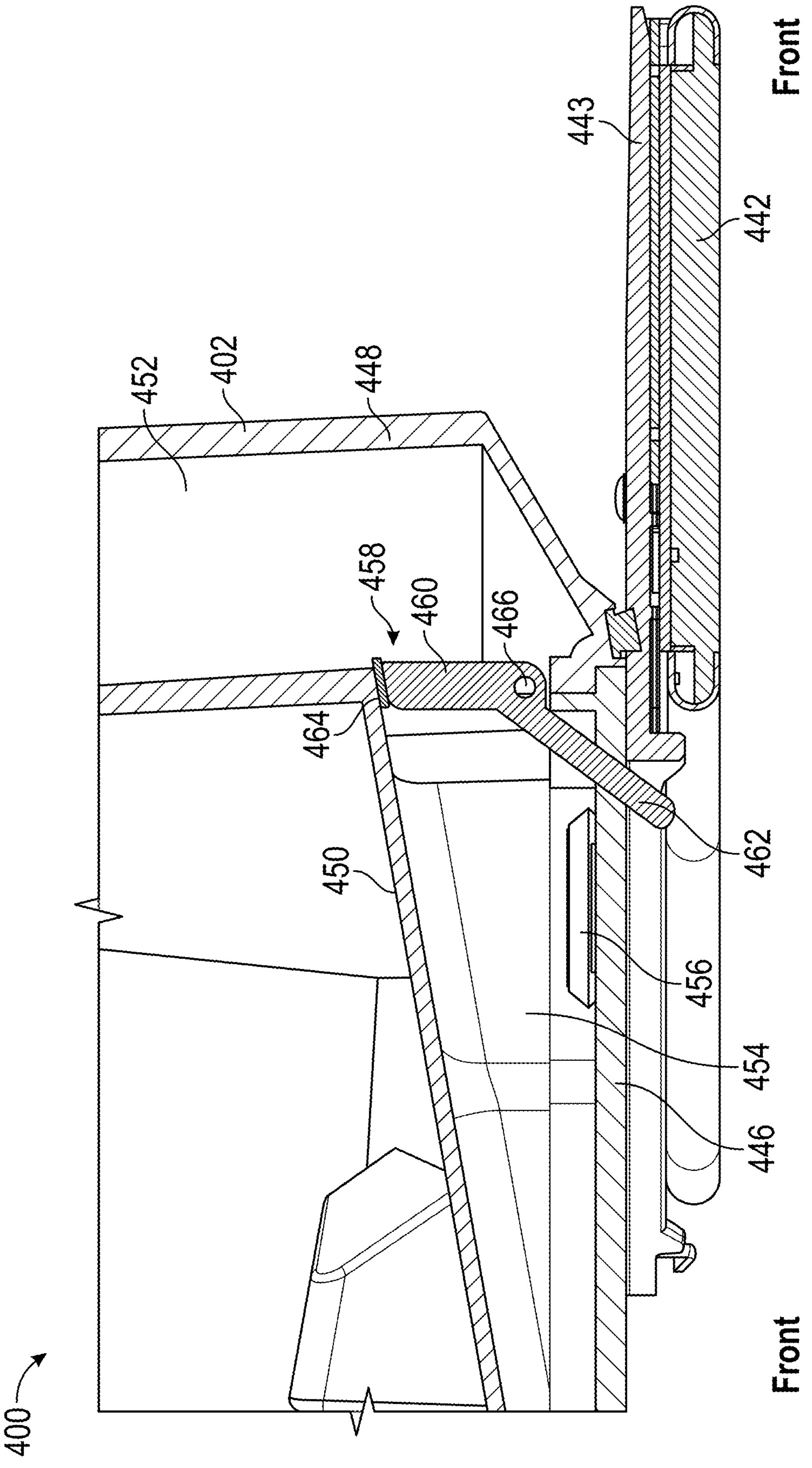
FIG. 6 illustrates a cross-section view of a portion of a mobile cleaning robot.
Figure 7:
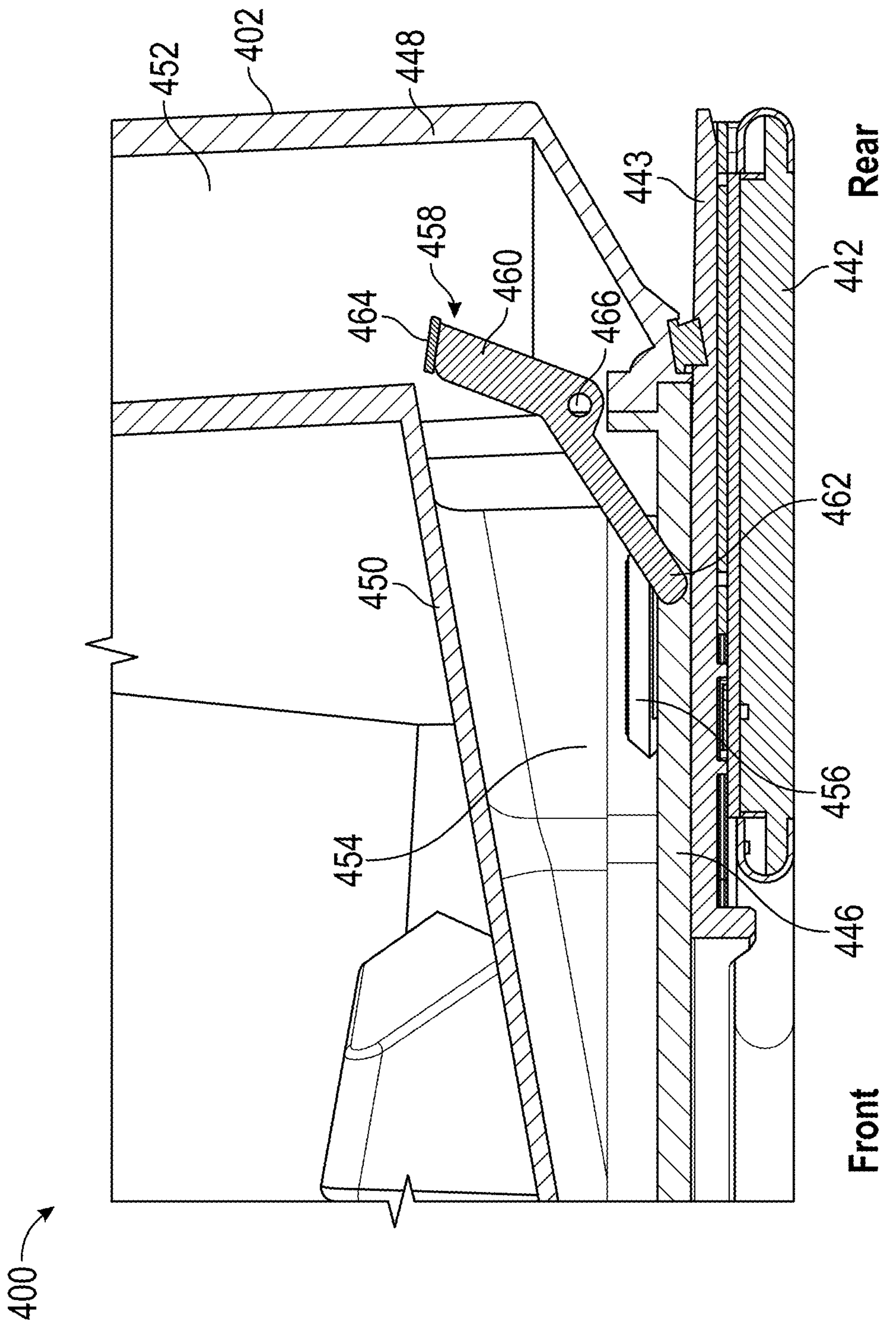
FIG. 7 illustrates a cross-section view of a portion of a mobile cleaning robot.

FIG. 6 illustrates a cross-section view of a portion of the mobile cleaning robot 400. FIG. 7 illustrates a cross-section view of a portion of the mobile cleaning robot 400. The mobile cleaning robot 400 of FIGS. 6 and 7 can be consistent with the mobile cleaning robot 400 of FIGS. 4 and 5; FIGS. 6 and 7 show how the mobile cleaning robot 400 can operate. FIGS. 6 and 7 also show orientation indicators Front and Rear. FIGS. 6 and 7 are discussed together below.

For example, as shown in FIG. 6, the valve 458 can be in a closed position, such that the pad tray 443 is not engaged with the leg 462 and the biasing element 468 (of FIG. 5) biases the body 460 to a closed position where the gasket 464 forms a seal between the body 460 and the inner wall 450 (or other wall of the body 402) to form a seal between the reservoir 452 and between the dispenser reservoir 454. When the valve 458 is in this closed position, the seal between the inner wall 450 and the body 460 can limit flow of water or fluid to the wicking device 456 and therefore can limit dispensing of fluid from the body 402 to the mopping pad 442 or to the flooring surface of the environment, such as during vacuuming (or non-mopping operations) of the mobile cleaning robot 400.

Then, as shown in FIG. 7, the pad tray 443 can be translated (e.g., forward) to move toward a deployed position or a cleaning or mopping position. As the pad tray 443 (and the mopping pad 442) are moved (e.g., forward), the pad tray 443 can engage the leg 462. When the pad tray 443 moves the leg 462 sufficiently forward to push the leg 462, the biasing force from the biasing element 468 (shown in FIG. 5) can be overcome and the valve 458 (e.g., the body 460) can move or rotate to the open position. In the open position of the valve 458, the body 460 can be moved away from the inner wall 450 such that a gap forms between the body 460 and the inner wall 450, which can allow water or fluid to flow from the reservoir 452 to the dispenser reservoir 454, allowing fluid to be dispensed from the dispenser reservoir 454 to the mopping pad 442 via the wicking device 456 (or devices).

When the pad tray 443 and the mopping pad 442 are retracted or moved back to the stored position (e.g., of FIG. 2A), the pad tray 443 can disengage the leg 462, allowing the biasing element 468 to cause the body 460 to rotate to the closed position (shown in FIG. 6), forming the seal between the body 460 and the inner wall 450, and limiting flow from the reservoir 452 to the dispenser reservoir 454 to limit or interrupt or stop dispensing to the mopping pad 442 or the flooring surface. In this way, the biasing element 468 can be used as a passive dispensing control device, allowing for dynamic water dispensing during a cleaning mission while helping to save energy during mopping operations and while helping to reduce manufacturing costs by eliminating a need for a pump.

Figure 8:
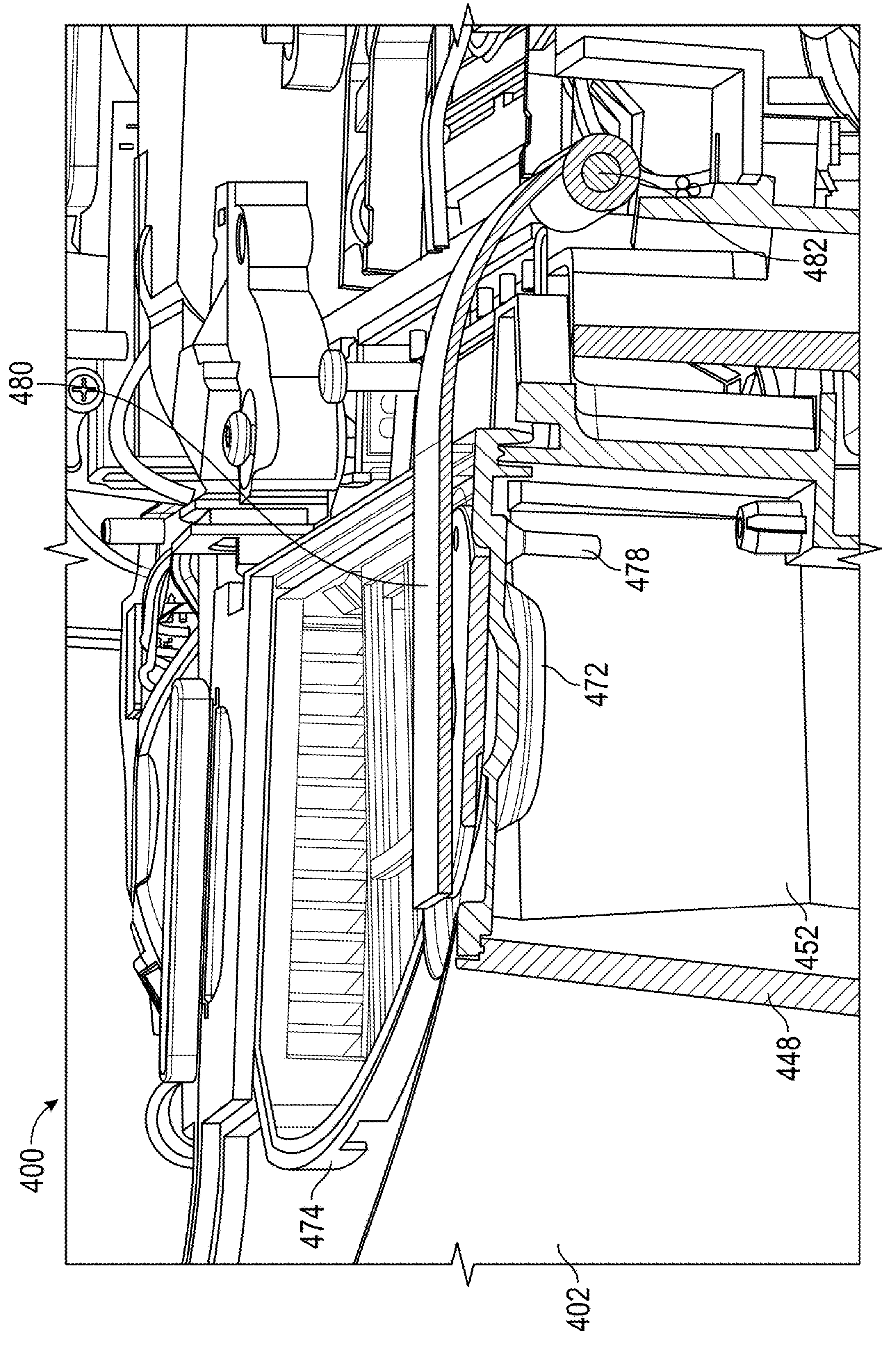
FIG. 8 illustrates a top isometric view of a portion of a mobile cleaning robot.
Figure 9:
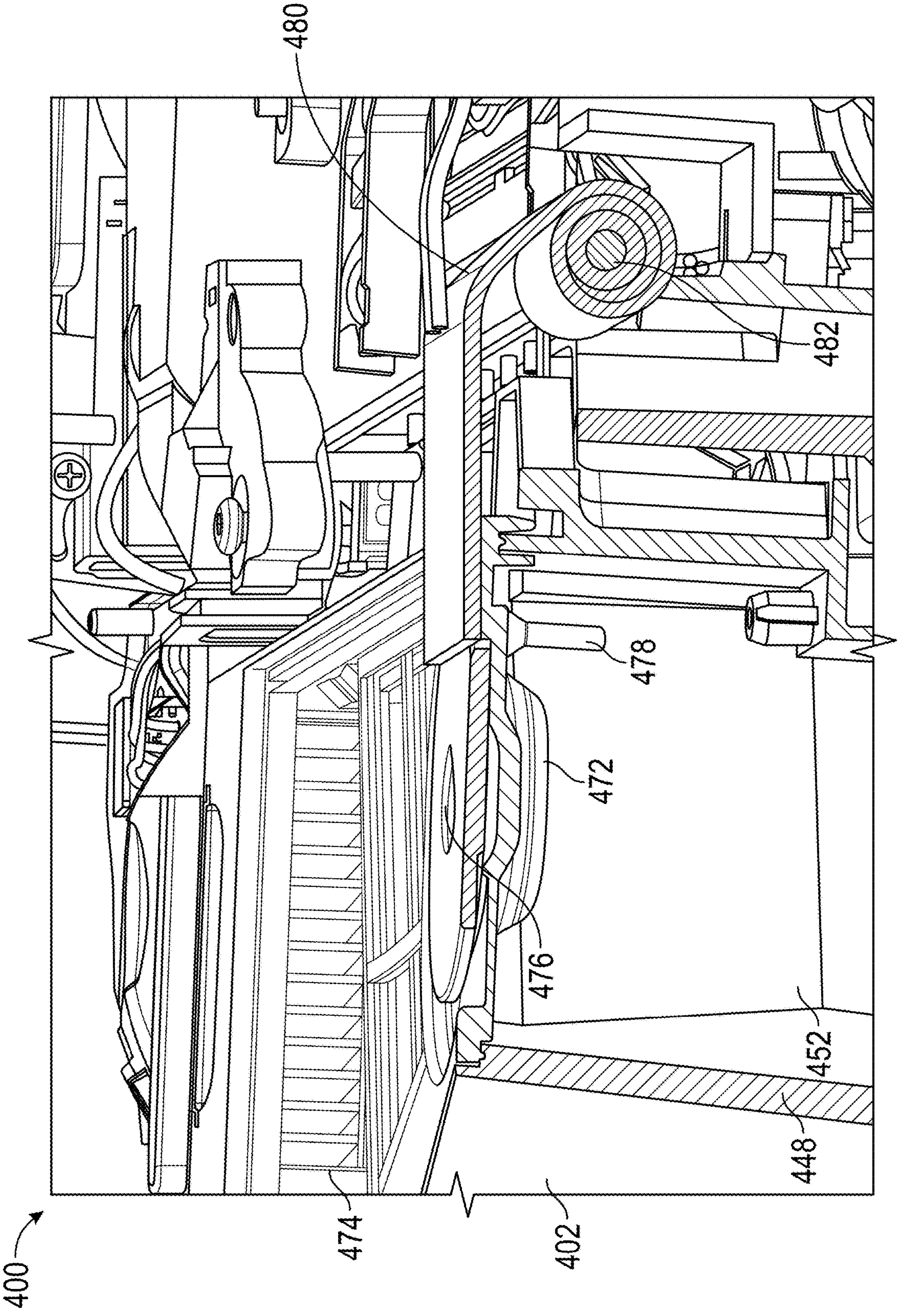
FIG. 9 illustrates a top isometric view of a portion of a mobile cleaning robot.

FIG. 8 illustrates a top isometric view of a portion of the mobile cleaning robot 400. FIG. 9 illustrates a top isometric view of a portion of the mobile cleaning robot 400. The mobile cleaning robot 400 of FIGS. 8 and 9 can be consistent with the mobile cleaning robot 400 of FIGS. 4-7, but shows a fill operating mechanism that can be used to control flow of fluid from the robot in addition to or in lieu of the valve discussed with respect to FIGS. 4-7. Any of the robots discussed herein can include the features of the mobile cleaning robot 400 of FIGS. 8 and 9.

For example, FIGS. 8 and 9 show a fill cap 472 connected to a top portion 474 of the body 402, which can be, for example, a portion of a tank of the body 402. The fill cap 472 can include one or more vent holes 476 that can include one or more check valves (e.g., within the fill cap 472), such that the vent hoes 476 extend at least partially through the fill cap 472. The fill cap 472 can also include a tail 478 that can help to retain the fill cap 472 in its place with respect to the body 402. Lifting of the fill cap 472 can expose a volume of the reservoir to a pressure of the environment outside the mobile cleaning robot 400 to the reservoir 452. In operation, the fill cap 472 can receive fluid through the fill cap 472 into the reservoir 452 and the one or more vent holes 476 can allow air to pass in or out of the reservoir 452 to allow fluid to flow out of the reservoir 452 to the dispenser reservoir 454, as discussed in further detail below. The check valves can limit air from passing from the reservoir 452 to outside the robot 400.

FIGS. 8 and 9 also show a cover 480 and a drive shaft 482 of the drive mechanism. For example, the drive shaft 482 can be connected to the arms that drive movement of the pad tray 443 (such as the arms 106). The cover 480 can be connected to the drive system via the drive shaft 482. This connection can allow the cover 480 to be movable with the drive shaft 482 between a covered position (shown in FIG. 8) when the pad tray 443 is in the stored position and between an uncovered position (shown in FIG. 9) when the pad tray 443 is in the deployed position.

That is, when the pad tray 443 is moved to the stored position, the cover 480 can be automatically moved to the covered position by the drive shaft 482. And, when the pad tray 443 is moved to the deployed position, the cover 480 can be automatically moved to the uncovered position. Optionally, when the cover 480 moves toward the uncovered position, the cover 480 can at least partially wrap around the drive shaft 482 to help provide space for movement of the cover 480 between the positions.

Because the one or more vent holes 476 can be connected to or can include one or more check valves, the vent holes 476 can be configured to operate passively to equalize a pressure of the reservoir with the pressure of the environment, and the one or more vent holes 476 can receive air into the reservoir 452 through the one or more vent holes 476 when the one or more vent holes 476 are uncovered, limiting creation of a vacuum within the reservoirs (e.g., the reservoir 452), allowing water to flow through the wicking device(s) 456.

When the vent holes 476 are covered, the one or more vent holes 476 can be covered such that a pressure in the reservoir 452 cannot equalize and a vacuum pressure can build within the reservoir(s) 452 or 454, limiting dispensing from the wicking device 456. And, when the vent holes 476 and the cover 480 together expose the reservoir 452 to the pressure of the environment when the cover 480 is in the uncovered position, water (or liquid or fluid) can flow from the reservoir 452 or the dispenser reservoir 454 and through the wicking device 456 to the mopping pad 442 (or to the floor). In this way, the cover 480 and the one or more vent holes 476 (together with the wicking device 456) can operate to dynamically dispense fluid or liquid from the mobile cleaning robot 400 based on a position of the pad tray 443 or the mopping pad 442.

The reservoir 452 and the dispenser reservoir 454 can optionally be combined in an example where the valve 458 is not included and the cover 480 is used to control flow out of the wicking device 456. Also, the cover 480 and the one or more vent holes 476 can operate as a standalone flow control device or can work together with one or more other flow control devices, such as the valve 458.

Figure 10:
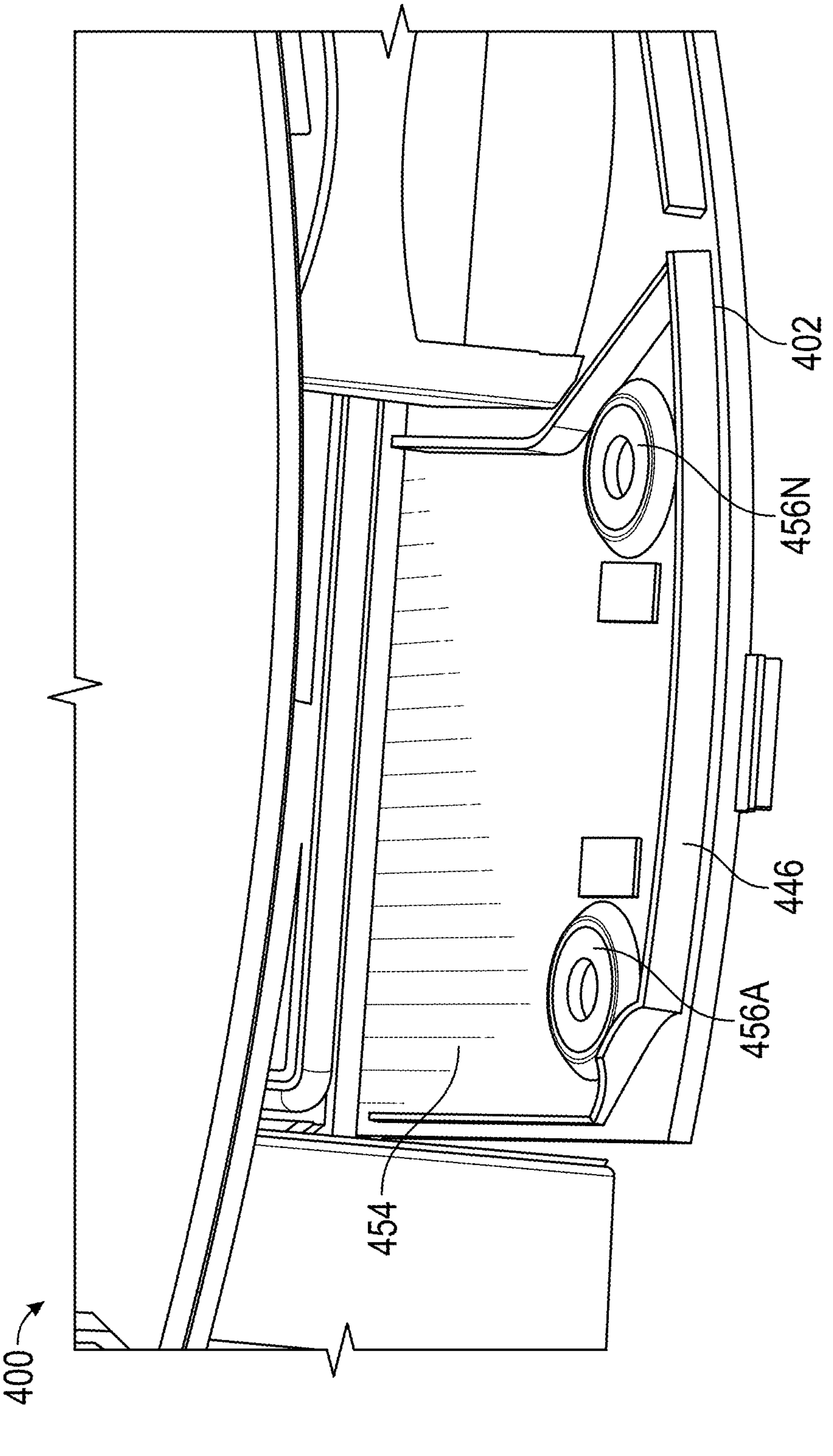
FIG. 10 illustrates an isometric view of a portion of a mobile cleaning robot.

FIG. 10 illustrates an isometric view of a portion of the mobile cleaning robot 400. The mobile cleaning robot 400 of FIG. 10 can be consistent with the mobile cleaning robot 400 of FIGS. 4-9. FIG. 10 shows that the mobile cleaning robot 400 can include one or more wicking devices **456*a*-456*n*. Each of the wicking devices 456*a*-456*n* can extend at least partially through the lower portion 446 of the body 402 to allow the wicking devices 456 to distribute fluid from the dispenser reservoir 454 to the mopping pad 442 or a flooring surface. Though two of the wicking devices 456 are shown, the mobile cleaning robot 400** can include 1, 3, 4, 5, 6, 7, 8, 9, 10 wicking devices, or the like.

Figure 11:
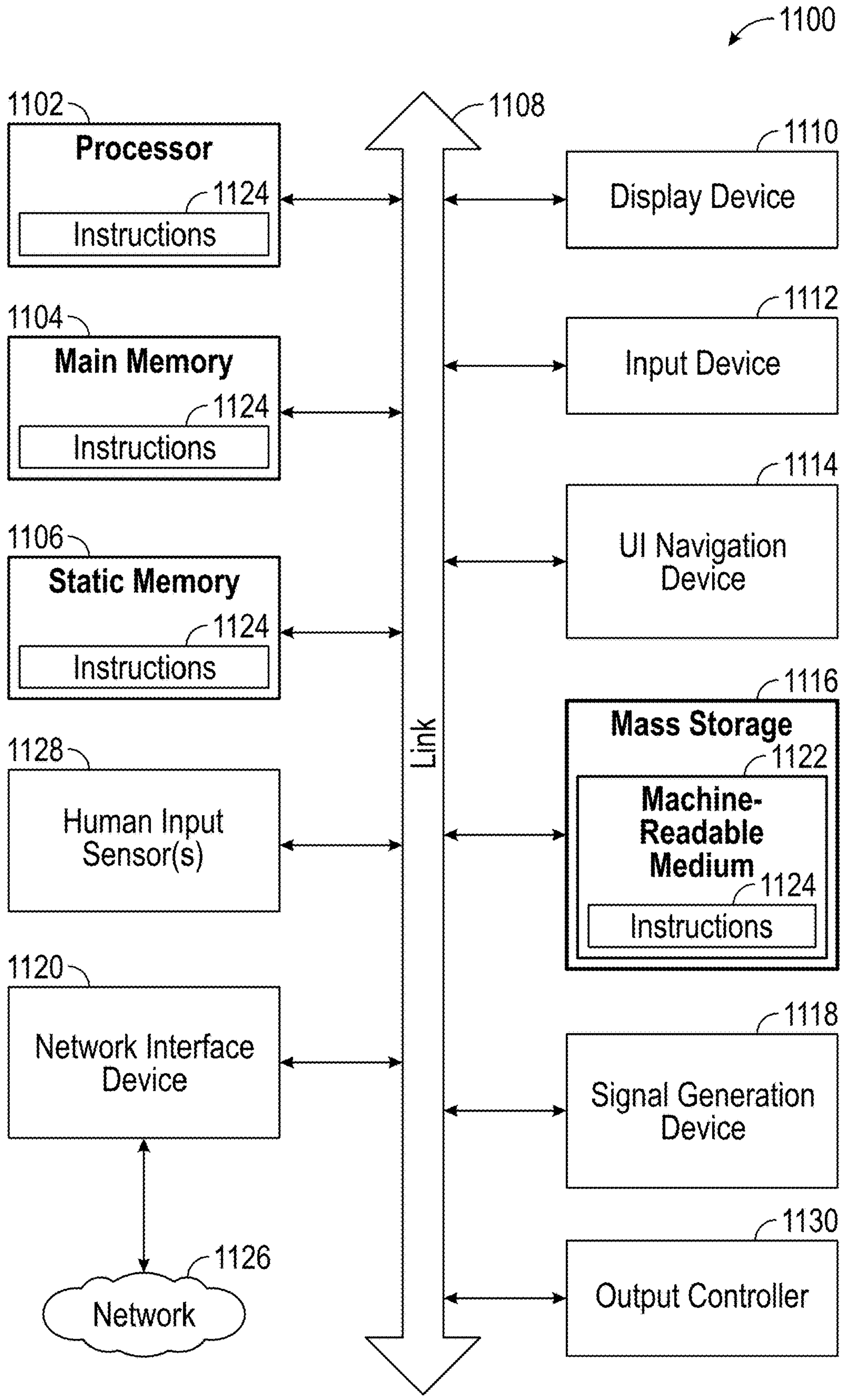
FIG. 11 illustrates a block diagram illustrating an example of a machine upon which one or more embodiments may be implemented.

FIG. 11 illustrates a block diagram of an example machine 1100 upon which any one or more of the techniques (e.g., methodologies) discussed herein may perform. Examples, as described herein, may include, or may operate by, logic or a number of components, or mechanisms in the machine 1100. Circuitry (e.g., processing circuitry) is a collection of circuits implemented in tangible entities of the machine 1100 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 1100 follow.

In alternative embodiments, the machine 1100 may operate as a standalone device or may be connected (e.g., networked) to other machines. In a networked deployment, the machine 1100 may operate in the capacity of a server machine, a client machine, or both in server-client network environments. In an example, the machine 1100 may act as a peer machine in peer-to-peer (P2P) (or other distributed) network environment. The machine 1100 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 1100 may include a hardware processor 1102 (e.g., a central processing unit (CPU), a graphics processing unit (GPU), a hardware processor core, or any combination thereof), a main memory 1104, a static memory (e.g., memory or storage for firmware, microcode, a basic-input-output (BIOS), unified extensible firmware interface (UEFI), etc.) 1106, and mass storage 1108 (e.g., hard drive, tape drive, flash storage, or other block devices) some or all of which may communicate with each other via an interlink (e.g., bus) 1130. The machine 1100 may further include a display unit 1110, an alphanumeric input device 1112 (e.g., a keyboard), and a user interface (UI) navigation device 1114 (e.g., a mouse). In an example, the display unit 1110, input device 1112 and UI navigation device 1114 may be a touch screen display. The machine 1100 may additionally include a storage device (e.g., drive unit) 1108, a signal generation device 1118 (e.g., a speaker), a network interface device 1120, and one or more sensors 1116, such as a global positioning system (GPS) sensor, compass, accelerometer, or other sensor. The machine 1100 may include an output controller 1128, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 1102, the main memory 1104, the static memory 1106, or the mass storage 1108 may be, or include, a machine readable medium 1122 on which is stored one or more sets of data structures or instructions 1124 (e.g., software) embodying or utilized by any one or more of the techniques or functions described herein. The instructions 1124 may also reside, completely or at least partially, within any of registers of the processor 1102, the main memory 1104, the static memory 1106, or the mass storage 1108 during execution thereof by the machine 1100. In an example, one or any combination of the hardware processor 1102, the main memory 1104, the static memory 1106, or the mass storage 1108 may constitute the machine readable media 1122. While the machine readable medium 1122 is illustrated as a single medium, the term "machine readable medium" may include a single medium or multiple media (e.g., a centralized or distributed database, and/or associated caches and servers) configured to store the one or more instructions 1124.

The term "machine readable medium" may include any medium that is capable of storing, encoding, or carrying instructions for execution by the machine 1100 and that cause the machine 1100 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1124 may be further transmitted or received over a communications network 1126 using a transmission medium via the network interface device 1120 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1120 may include one or more physical jacks (e.g., Ethernet, coaxial, or phone jacks) or one or more antennas to connect to the communications network 1126. In an example, the network interface device 1120 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1100, and includes digital or analog communications signals or other intangible medium to facilitate communication of such software. A transmission medium is a machine readable medium.

Notes and Examples

The following, non-limiting examples, detail certain aspects of the present subject matter to solve the challenges and provide the benefits discussed herein, among others.

Example 1 is a mobile cleaning robot movable about a flooring surface of an environment, the mobile cleaning robot comprising: a body at least partially defining a reservoir configured to store liquid therein; a pad tray connected to the body and movable with respect to the body between a stored position and a deployed position; a cleaning pad connectable to the pad tray and moveable therewith, the cleaning pad configured to apply liquid from the reservoir onto the flooring surface when the cleaning pad and the pad tray are in the deployed position; a valve connected to the body, the valve movable between a closed position where liquid flow is limited and an open position where liquid flow to the cleaning pad is permitted; and a drive system connected to the body and connected to the pad tray, the drive system operable to move the pad tray and the cleaning pad with respect to the body between the stored position and the deployed position, the pad tray or the cleaning pad engageable with the valve to move the valve to the open position when the drive system moves the pad tray and the cleaning pad to the deployed position.

In Example 2, the subject matter of Example 1 optionally includes wherein the valve includes a leg configured to extend below a bottom surface of the body, the pad tray engageable with the leg to move the valve to the open position when the pad tray moves to the deployed position.

In Example 3, the subject matter of Example 2 optionally includes wherein the valve includes a body connected to the leg, the body configured to form a seal with the reservoir when the valve is in the closed position.

In Example 4, the subject matter of Example 3 optionally includes a pin connected to the body or the leg, the valve rotatable about the pin between the closed position and the open position.

In Example 5, the subject matter of Example 4 optionally includes a biasing element engaged with the body and the valve to bias the valve toward the closed position.

In Example 6, the subject matter of any one or more of Examples 1-5 optionally include a wicking port connected to the body and located downstream of the reservoir, the wicking port configured to receive and dispense the liquid to the cleaning pad when the valve is in the open position.

In Example 7, the subject matter of Example 6 optionally includes a vent connected to the reservoir and configured to expose a volume of the reservoir to a pressure of the environment.

In Example 8, the subject matter of Example 7 optionally includes wherein the vent is located at a top of the reservoir and is configured to operate passively to equalize a pressure of the reservoir with the pressure of the environment.

In Example 9, the subject matter of any one or more of Examples 7-8 optionally include a cover connected to the drive system and movable therewith between a covered position when the pad tray is in the stored position and between an uncovered position when the pad tray is in the deployed position, the vent configured to expose the reservoir to the pressure of the environment when the cover is in the uncovered position.

In Example 10, the subject matter of Example 9 optionally includes wherein the cover is connected to a drive shaft of the drive system, the cover rotatable with the drive shaft between the covered position and the uncovered position.

Example 11 is a mobile cleaning robot movable about a flooring surface of an environment, the mobile cleaning robot comprising: a body at least partially defining a reservoir configured to store liquid therein; a wicking port connected to the body and configured to wick liquid from the reservoir to outside the body; a pad tray connected to the body and movable with respect to the body between a stored position and a deployed position; a cleaning pad connected to the pad tray and moveable therewith, the cleaning pad configured to transfer liquid from the wicking port onto the flooring surface when the cleaning pad and pad tray are in the deployed position; a vent connected to the reservoir and configured to expose a volume of the reservoir to a pressure of the environment; a drive system connected to the body and connected to the pad tray, the drive system operable to move the pad tray and the cleaning pad with respect to the body between the stored position and the deployed position; and a cover connected to the drive system and movable therewith between a covered position when the pad tray is in the stored position and between an uncovered position when the pad tray is in the deployed position, the vent configured to expose the reservoir to the pressure of the environment when the cover is in the uncovered position to allow the liquid to be transferred liquid from the wicking port onto the flooring surface.

In Example 12, the subject matter of Example 11 optionally includes wherein the vent is located at a top of the reservoir and is configured to operate passively to equalize a pressure of the reservoir with the pressure of the environment.

In Example 13, the subject matter of any one or more of Examples 11-12 optionally include wherein the cover is flexible and configured to wrap around at least a portion of the drive system.

In Example 14, the subject matter of Example 13 optionally includes wherein the cover is configured to wrap at least partially around a drive shaft of the drive system when the cover is in the uncovered position.

In Example 15, the subject matter of any one or more of Examples 11-14 optionally include a valve connected to the body, the valve movable between a closed position and an open position where liquid flow to the cleaning pad is permitted.

In Example 16, the subject matter of Example 15 optionally includes wherein the valve includes a leg configured to extend below a bottom surface of the body, the pad tray engageable with the leg to move the valve to the open position when the pad tray moves to the deployed position.

In Example 17, the subject matter of Example 16 optionally includes wherein the leg is movable between a first position associated with the closed position and a second position associated with the open position.

In Example 18, the subject matter of any one or more of Examples 16-17 optionally include wherein the valve includes a body connected to the leg, the body configured to form a seal with the reservoir when the valve is in the closed position.

In Example 19, the subject matter of Example 18 optionally includes a pin connected to the body or the leg, the valve rotatable about the pin between the closed position and the open position.

In Example 20, the subject matter of Example 19 optionally includes a biasing element engaged with the body and the valve to bias the valve toward the closed position.

In Example 21, the apparatuses or method of any one or any combination of Examples 1-20 can optionally be configured such that all elements or options recited are available to use or select from.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A mobile cleaning robot movable about a flooring surface of an environment, the mobile cleaning robot comprising:

a body at least partially defining a reservoir configured to store liquid therein;

a pad tray connected to the body and movable with respect to the body between a stored position and a deployed position;

a cleaning pad connectable to the pad tray and moveable therewith, the cleaning pad configured to apply liquid from the reservoir onto the flooring surface when the cleaning pad and the pad tray are in the deployed position;

a valve connected to the body, the valve movable between a closed position where liquid flow is limited and an open position where liquid flow to the cleaning pad is permitted; and a drive system connected to the body and connected to the pad tray, the drive system operable to move the pad tray and the cleaning pad with respect to the body between the stored position and the deployed position, the pad tray or the cleaning pad engageable with the valve to move the valve to the open position when the drive system moves the pad tray and the cleaning pad to the deployed position.

2. The mobile cleaning robot of claim 1, wherein the valve includes a leg configured to extend below a bottom surface of the body, the pad tray engageable with the leg to move the valve to the open position when the pad tray moves to the deployed position.

3. The mobile cleaning robot of claim 2, wherein the valve includes a body connected to the leg, the body configured to form a seal with the reservoir when the valve is in the closed position.

4. The mobile cleaning robot of claim 3, further comprising:

a pin connected to the body or the leg, the valve rotatable about the pin between the closed position and the open position.

5. The mobile cleaning robot of claim 4, further comprising:

a biasing element engaged with the body and the valve to bias the valve toward the closed position.

6. The mobile cleaning robot of claim 1, further comprising:

a wicking port connected to the body and located downstream of the reservoir, the wicking port configured to receive and dispense the liquid to the cleaning pad when the valve is in the open position.

7. The mobile cleaning robot of claim 6, further comprising:

a vent connected to the reservoir and configured to expose a volume of the reservoir to a pressure of the environment.

8. The mobile cleaning robot of claim 7, wherein the vent is located at a top of the reservoir and is configured to operate passively to equalize a pressure of the reservoir with the pressure of the environment.

9. The mobile cleaning robot of claim 7, further comprising:

a cover connected to the drive system and movable therewith between a covered position when the pad tray is in the stored position and an uncovered position when the pad tray is in the deployed position, the vent configured to expose the reservoir to the pressure of the environment when the cover is in the uncovered position.

10. The mobile cleaning robot of claim 9, wherein the cover is connected to a drive shaft of the drive system, the cover rotatable with the drive shaft between the covered position and the uncovered position.

11. The mobile cleaning robot of claim 1, wherein, in the stored position, the pad tray is positioned above the body and, in the deployed position, the pad tray is extended below the body to contact the flooring surface.

12. A mobile cleaning robot movable about a flooring surface of an environment, the mobile cleaning robot comprising:

a body at least partially defining a reservoir configured to store liquid therein;

a wicking port connected to the body and configured to wick liquid from the reservoir to outside the body;

a pad tray connected to the body and movable with respect to the body between a stored position and a deployed position;

a cleaning pad connected to the pad tray and moveable therewith, the cleaning pad configured to transfer liquid from the wicking port onto the flooring surface when the cleaning pad and pad tray are in the deployed position;

a vent connected to the reservoir and configured to expose a volume of the reservoir to a pressure of the environment;

a drive system connected to the body and connected to the pad tray, the drive system operable to move the pad tray and the cleaning pad with respect to the body between the stored position and the deployed position; and a cover connected to the drive system and movable therewith between a covered position when the pad tray is in the stored position and an uncovered position when the pad tray is in the deployed position, the vent configured to expose the reservoir to the pressure of the environment when the cover is in the uncovered position to allow the liquid to be transferred liquid from the wicking port onto the flooring surface.

13. The mobile cleaning robot of claim 12, wherein the vent is located at a top of the reservoir and is configured to operate passively to equalize a pressure of the reservoir with the pressure of the environment.

14. The mobile cleaning robot of claim 12, wherein the cover is flexible and configured to wrap around at least a portion of the drive system.

15. The mobile cleaning robot of claim 14, wherein the cover is configured to wrap at least partially around a drive shaft of the drive system when the cover is in the uncovered position.

16. The mobile cleaning robot of claim 12, further comprising:

a valve connected to the body, the valve movable between a closed position and an open position where liquid flow to the cleaning pad is permitted.

17. The mobile cleaning robot of claim 16, wherein the valve includes a leg configured to extend below a bottom surface of the body, the pad tray engageable with the leg to move the valve to the open position when the pad tray moves to the deployed position.

18. The mobile cleaning robot of claim 17, wherein the leg is movable between a first position associated with the closed position and a second position associated with the open position.

19. The mobile cleaning robot of claim 17, wherein the valve includes a body connected to the leg, the body configured to form a seal with the reservoir when the valve is in the closed position.

20. The mobile cleaning robot of claim 19, further comprising:

a pin connected to the body or the leg, the valve rotatable about the pin between the closed position and the open position, and a biasing element engaged with the body and the valve to bias the valve toward the closed position.

* * * * *